United States Patent
Huang

(10) Patent No.: US 10,805,275 B1
(45) Date of Patent: Oct. 13, 2020

(54) MULTI-PROCESS ARCHITECTURE FOR IMPLEMENTING A SECURE INTERNET SERVICE

(71) Applicant: Trend Micro Incorporated, Tokyo (JP)

(72) Inventor: Hua-Lung Richard Huang, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 16/547,220

(22) Filed: Aug. 21, 2019

Related U.S. Application Data

(63) Continuation of application No. 11/210,320, filed on Aug. 23, 2005, now abandoned.

(51) Int. Cl.
  *H04L 29/06* (2006.01)
  *H04L 29/08* (2006.01)
  *G06F 21/62* (2013.01)

(52) U.S. Cl.
  CPC ........ *H04L 63/0428* (2013.01); *H04L 63/168* (2013.01); *H04L 67/02* (2013.01); *G06F 21/6263* (2013.01)

(58) Field of Classification Search
  CPC ... H04L 63/0428; H04L 63/168; H04L 67/02; G06F 21/6263
  USPC .......................................................... 726/3
  See application file for complete search history.

(56) References Cited

U.S. PATENT DOCUMENTS

| | | | |
|---|---|---|---|
| 5,682,534 A * | 10/1997 | Kapoor ................. | G06F 9/547 709/203 |
| 5,754,752 A * | 5/1998 | Sheh ................... | G06F 11/1443 709/227 |
| 6,704,806 B1 * | 3/2004 | Decker ................ | G06F 9/4843 717/127 |
| 6,757,685 B2 * | 6/2004 | Raffaele .............. | G06F 9/468 |
| 7,376,955 B1 * | 5/2008 | Forman ............... | G06F 9/4843 709/201 |

* cited by examiner

*Primary Examiner* — Dant B Shaifer Harriman
(74) *Attorney, Agent, or Firm* — Okamoto & Benedicto LLP

(57) ABSTRACT

A method in an internet server for implementing internet service, the method including exclusively binding a first socket handle object of a first process with a first port. The method also includes generating a first child process from the first process and creating a first duplicate socket handle of the first socket handle object in a first file, the first file being associated with an id of the first child process. The method further includes forming, using the first child process, a first child socket handle object from the first duplicate socket handle in the first file, thereby causing the first child socket handle object to be associated with the first port.

22 Claims, 4 Drawing Sheets

MULTI-PROCESS ARCHITECTURE FOR IMPLEMENTING A SECURE INTERNET SERVICE

CROSS-REFERENCE TO RELATED APPLICATION(S)

The present application is a continuation of U.S. patent application Ser. No. 11/210,320, filed Aug. 23, 2005, entitled "Multi-Process Architecture for Implementing a Secure Internet Service," the disclosure of which is hereby incorporated by reference.

BACKGROUND OF THE INVENTION

The growing popularity of the Internet has given rise to a wide variety of Internet services. These Internet services enable Internet users, through their Internet browsers, to access data and/or execute applications that are maintained by and/or provided on a remotely located server. Examples of these Internet services include email relay, Internet shopping, gaming, database access, data processing, data acquisition, etc.

In an internet server environment, for example, an application executing on an internet server may service multiple remotely located users who connect to the internet server through the Internet. In this example, the application executing on the server is commonly referred to as a process, and such process may spawn a plurality of threads on the internet server computer to service the plurality of remotely located users through their respective browsers.

To facilitate discussion, FIG. 1 shows an example prior art Internet service environment 102. In the example of FIG. 1, a plurality of users 104a, 104b, and 104c are utilizing respective web browsers 106a, 106b, and 106c to access an Internet service, such as catalog shopping, that is provided by an internet server 108. These web browsers, such as Internet Explorer™ (Microsoft Corp. of Redmond, Wash.) or Firefox™ (www.mozilla.org), may be executed on individual Internet-enabled computers that are connected to the Internet 110. These browsers may make individual socket connections 116a, 116b, and 116c to a port 126 on internet server 108 to access the Internet service offered by internet server 108.

An application on internet server 108 is shown as a process 120 executing in a user space 122 of internet server 108. Process 120 has a socket handle object 124 that binds with a port 126 (for example port 80 in kernel space 128 of internet server 108). A plurality of threads 130a, 130b, and 130c, which are spawned by process 120 for servicing the needs of users 104a, 104b, and 104c, listen to activities on socket handle object 124. Since socket handle object 124 binds with port 126, activities on port 126 are accessible to the threads monitoring socket handle object 124. When one of users 104a, 104b, and 104c issues a request for data via one of browsers 106a, 106b, and 106c, for example, this request is received by a respective thread via port 126 and socket handle object 124.

Access to socket handle object 124 and port 126 by a thread is typically controlled by some sort of arbitration mechanism, such as locking for example. When one of threads 130a, 103b, or 130c obtains the lock, it can exchange data with a respective one of browsers 106a, 106b, and 106c. Once that thread is finished, it releases the lock to allow other threads to service their respective users. In this manner, a single process 120 may be able to service a large number of remotely connected users.

If the Internet service involves sensitive data, such as credit card numbers, passwords, etc., security is a serious concern. If the data exchanged between one of users 104a-104c and one of threads 130a-130c can be intercepted by a third party 130, for example, the intercepted data may be employed to perpetrate fraud upon the user. Concerns regarding identity theft and loss of confidential data have caused many users to shun certain websites and/or refuse to utilize certain Internet services altogether.

The Internet service described earlier may be made secure by allowing only process 120 to bind, in an exclusive manner, with port 126. That is, the binding between socket handle object 124 may be requested by process 120 to be exclusive (via the Windows socket option SO_EXCLUSIVEADDRUSE for example), thereby preventing another process 140 from binding with port 126. In this manner, data traversing port 126 between users 104a-104c and their respective threads 130a-130c in internet server 108 is secure against unauthorized access by process 140.

However, the exclusive binding approach of the current art has at least one deficiency. Since only one process 120 can bind to port 126, if that process 120 hangs, corrupts or terminates due to erroneous or malicious actions by one of users 104a-104c (or another user), all the threads spawned by that process (e.g., threads 130a, 130b, and 130c) may terminate. When all threads associated with the single process 120 terminate, the Internet service offered by internet server 108 is unavailable to all users until process 120 can be brought up again.

As can be appreciated by those skilled in the art, the prior art exclusive binding approach offers security at the expense of reliability and robustness. In other words, although the data may be secure from unauthorized intercepts, the user's experience may be marred by undesirably frequent service interruptions, particularly when the process spawns hundreds or thousands of threads, and a fault due to any of the threads may cause the process and all its threads to terminate.

SUMMARY OF INVENTION

The invention relates, in an embodiment, to a method in an internet server for implementing internet service, the method including exclusively binding a first socket handle object of a first process with a first port. The method also includes generating a first child process from the first process and creating a first duplicate socket handle of the first socket handle object in a first file, the first file being associated with an id of the first child process. The method further includes forming, using the first child process, a first child socket handle object from the first duplicate socket handle in the first file, thereby causing the first child socket handle object to be associated with the first port.

In another embodiment, the invention relates an article of manufacture comprising a program storage medium having computer readable code embodied therein, the computer readable code being configured to implement internet service in an internet server. The article of manufacture further includes computer readable code for exclusively binding a first socket handle object of a first process with a first port. The article of manufacture also includes computer readable code for generating a first child process from the first process, and computer readable code for creating a first duplicate socket handle of the first socket handle object in a first file, the first file being associated with an id of the first child process. The article of manufacture additionally includes computer readable code for forming, using the first child process, a first child socket handle object from the first duplicate socket handle in the first file, thereby causing the first child socket handle object to be associated with the first port.

In yet another embodiment, the invention relates to a method in an internet server for implementing internet service for a plurality of remote users. The method includes exclusively binding a first socket handle object of a first process with a first port. The method also includes iteratively activating a plurality of child processes by performing the following steps (a) through (e). Step (a) includes generating a child process; step (b) includes suspending the child process after the generating the child process; step (c) includes creating a duplicate socket handle of the first socket handle object in a file, the file being associated with an id of the child process of step (a) while the child process is suspended. Step (d) includes waking up the child process from the suspending, step (e) includes forming, using the child process after the waking, a child socket handle object from the duplicate socket handle in the file, thereby causing the child socket handle object to be associated with the first port, wherein the steps (a) through (e) are performed to activate each child process of the plurality of child processes until the plurality of child processes are activated, and wherein the plurality of child process, not the first process, are responsible for executing threads that provide the internet service to the plurality of remote users.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
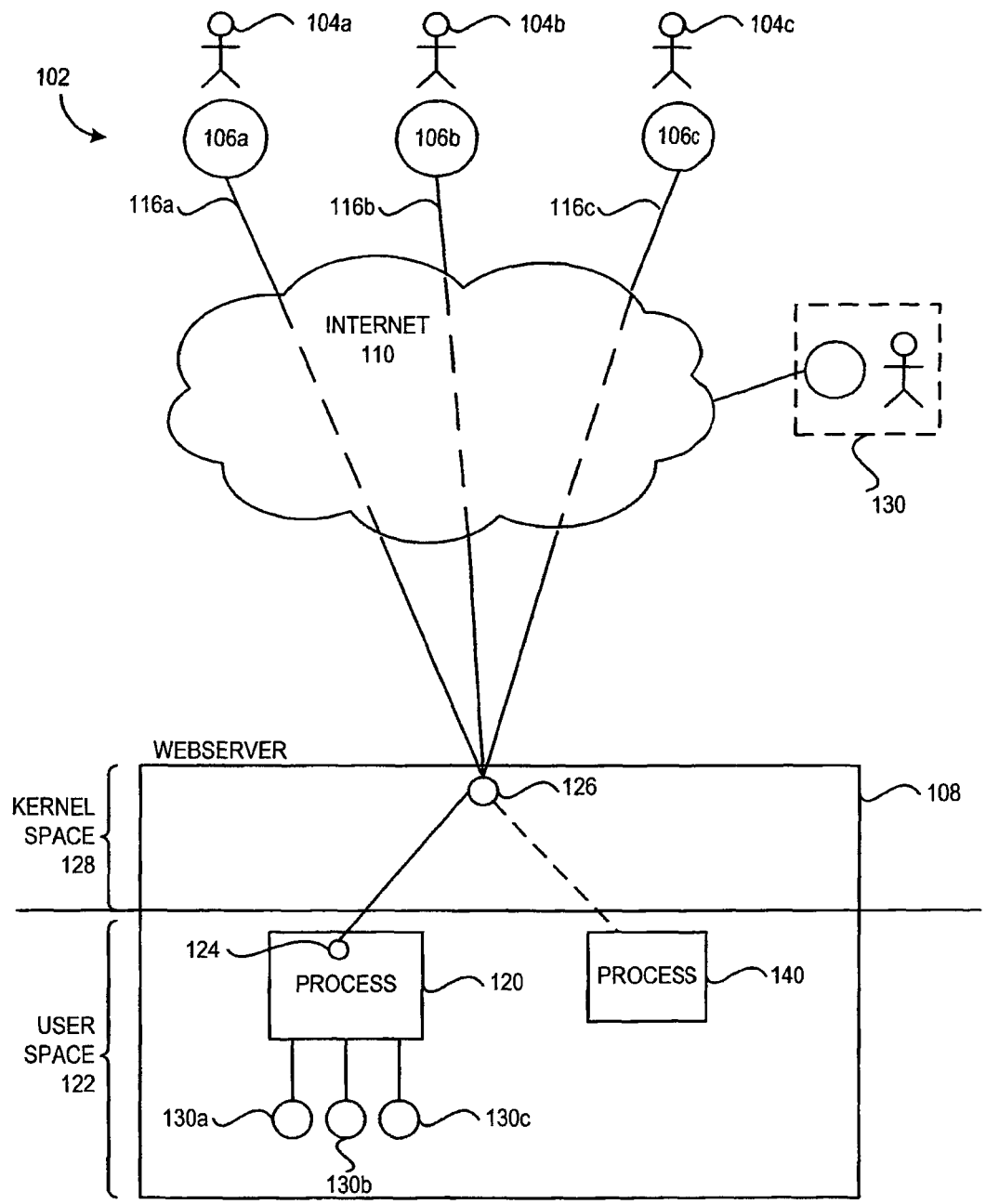
FIG. 1 shows an example prior art Internet service environment.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention relates, in an embodiment, to improved arrangements and techniques for providing internet service in an internet server. As the term is employed herein, an internet server represents any server or computer that is employed to provide an internet service. The improved arrangements and techniques are not only secure but are also highly reliable and robust. In an embodiment, a multi-process architecture is provided wherein the parent process exclusively binds its socket handle object to the internet server port to ensure security. Reliability is improved by the creation of a plurality of child processes having socket handle objects created from socket handles that are duplicates of the socket handle of the parent process. Since the child processes employ the duplicate socket handles to create their own socket handle objects, these child processes bind to the same port as the parent process and can receive service requests from a plurality of remotely connected users in a secure manner.

In an embodiment, the remotely connected users are serviced by a plurality of threads executed by a plurality of child processes in parallel. This is in contrast to the prior art approach where the threads that service the remote users are typically associated with a single process running on the internet server. By allowing the child processes to parallely execute the threads that provide the internet service to the plurality of remotely connected users, with the parent process acting in a supervisory role for the child processes, reliability is improved.

For example, if a child process is in a fault state (due to, for example, erroneous or malicious user input), the threads associated with that child process may be terminated. However, other child processes can continue to execute their respective threads. If the faulted child process terminates, only the threads associated with that faulted child process terminate, and only the users serviced by those threads are affected. Other users that are provided the internet service through threads associated with non-faulted child processes may continue using the internet service.

As mentioned, the parent process now acts in a supervisor capacity, monitoring execution parameters associated with its child processes to ascertain if and when a process fault occurs. If a child process terminates (due to a fault condition, for example), the parent process may spawn a replacement child process and the newly spawned child process would bind to the same port as the port to which the parent process is exclusively bound.

In an embodiment, the parent process is not directly accessible by users of the internet service. For example, unlike the child processes, the parent process does not execute a thread that provides the internet service to the user. Since the parent process does not execute threads that service the remotely-connected users, the likelihood that the parent process can be brought down due to a user's erroneous and/or malicious input is greatly reduced.

Figure 2:
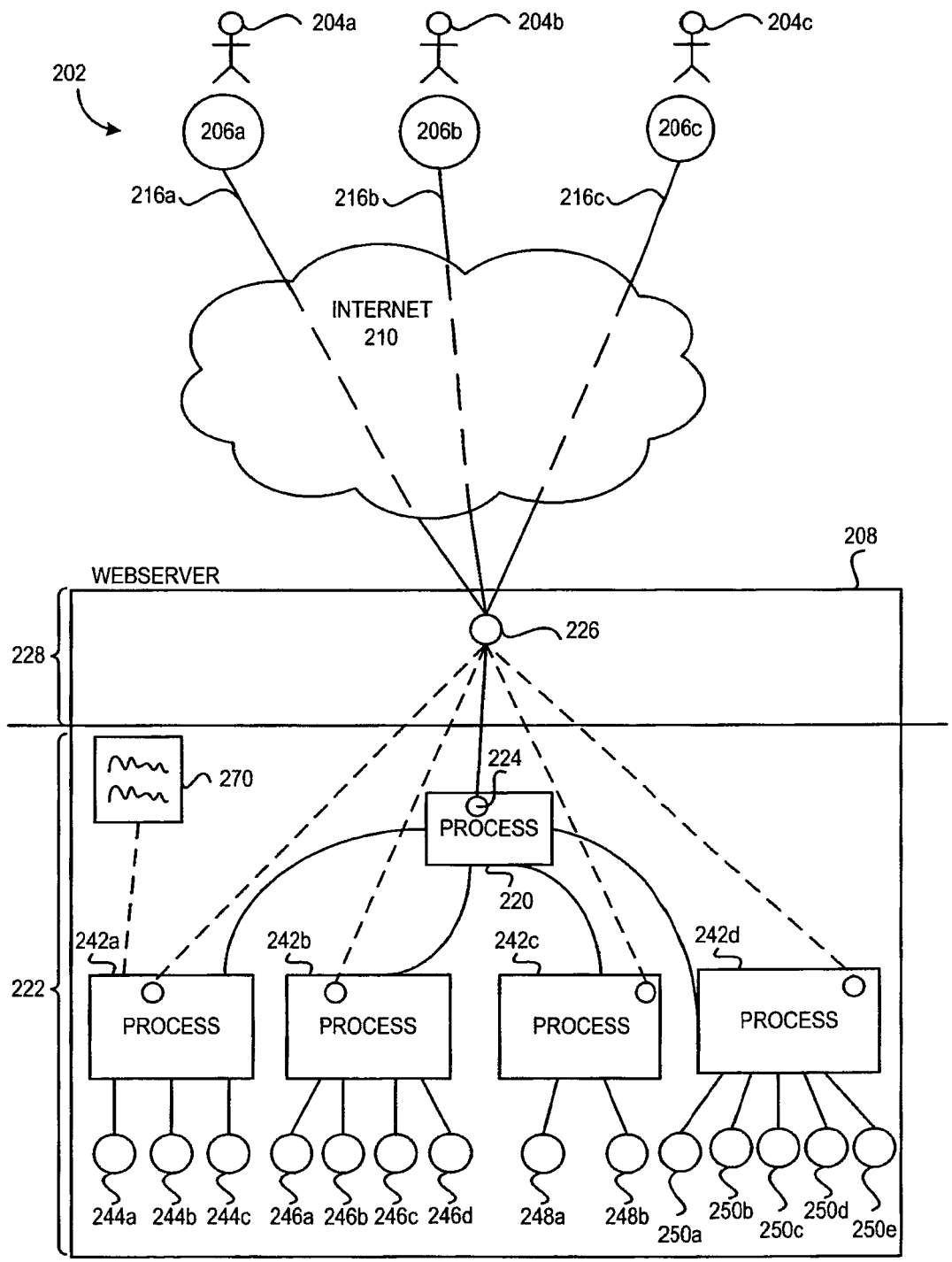
FIG. 2 shows, in accordance with an embodiment of the present invention, an improved environment for implementing an internet service.

The features and advantages of the present invention may be better understood with reference to the figures and discussions that follow. FIG. 2 shows, in accordance with an embodiment of the present invention, an environment 202 for implementing an internet service. In the example of FIG. 2, a plurality of users 204a, 204b, and 204c are utilizing respective web browsers 206a, 206b, and 206c to access an Internet service, such as catalog shopping, that is provided by a Windows-based internet server 208. These web browsers may be executed on individual Internet-enabled computers (not shown) that are connected to the Internet 210. These browsers may make individual socket connections 216a, 216b, and 216c to a port 226 on internet server 208 to access the Internet service offered by internet server 208. Although only three users and three respective browsers/socket connections are shown, it should be understood that there may be as many users as bandwidth allows.

An application on internet server 208 is shown as a process 220 executing in a user space 222 of internet server 208. Process 220 has a socket handle object 224 that binds exclusively with port 226 (for example port 80 in kernel space 228 of internet server 208). The exclusive binding ensures that data traversing port 226 is secure from being accessed by an unauthorized process.

However, unlike the situation of prior art FIG. 1, process 220 does not by itself execute all the threads that provide the internet service to users 204a, 204b, and 204c. Instead, process 220 acts as a parent process by spawning a plurality of child processes 242a, 242b, 242c, and 242d. These child processes execute in parallel, with each child process executing a plurality of treads to service a group of users. For example, child process 242a is shown executing a plurality of threads 244a, 244b, and 244c, while child process 242b is shown executing a plurality of threads 246a, 246b, 246c and 246d. Similarly, child process 242c is shown executing a plurality of threads 248a and 248b, while child process 242d is shown executing a plurality of threads 250a, 250b, 250c, 250d and 250e. The number of treads executed by each child process, as well as the number of child processes spawned by parent process 220, may vary from implementation to implementation.

Furthermore, the child processes 242a, 242b, 242c, and 242d all bind to the same port 226, thereby enabling threads associated with these child processes to receive and service requests from the remotely-connected users. To enable a child process to bind to the same port as the parent process 220, parent process 220 first creates a child process (such as child process 242a, for example). After child process 242a is created, parent process 220 may, in an embodiment, suspend child process 242a, i.e., put child process 242a into an inactive state. This inactive state prevents newly created child process 242a from unnecessarily consuming processing bandwidth trying to bind to a port on internet server 208.

After child process 242a is suspended, parent process 220 then creates a duplicate socket handle, which is essentially a duplicate of the socket handle associated with socket handle object 224. This duplicate socket handle is then saved into a file that is specifically associated with the id of child process 242a. The file containing the duplicate socket handle for child process 242a is shown in FIG. 2 as file 270.

After file 270 is created, parent process 220 then wakes up child process 242a. Upon waking up, code in child process 242a causes child process 242a to fetch the duplicate socket handle from file 270 (which is associated with the id of child process 242a) and to create a socket handle object from this retrieved duplicate socket handle. Since the created socket handle object for child process 242a is created from a duplicate socket handle that is essentially a duplicate of the socket handle associated with main socket handle object 224, child process 242a essentially binds to port 226 via its socket handle object as well. In an embodiment, after child process 242a retrieves the duplicate socket handle, file 270 is no longer necessary and may be deleted.

Child processes 242b, 242c and 242d are activated in a similar manner, with each child process being activated in turn using the sequence discussed above in connection with child process 242a. Once all child processes are activated, each child process may create and execute as many threads as necessary to service the remote users.

If one of the child processes enters a fault state (e.g., due to erroneous or malicious user input data or executable), that child process alone is in the fault state and other child processes may simply continue to execute their own threads. If the faulted child process terminates, only the threads executed by that child process is negatively impacted. All other threads associated with other child processes may continue servicing their respective threads. In this manner, only the group of users serviced by the threads of a faulted child process suffer any performance degradation. Since other child processes are not impacted, the users utilizing those other child processes may not even know that a problem has occurred with one of the child processes.

As mentioned, parent process 220 may take a supervisor role and monitor execution parameters pertaining to the child processes. If a child process (such as child process 242b) enters a fault condition and terminates, parent process 220 may spawn another child process and activate that newly spawned child process as a replacement for the terminated child process.

Figure 3:
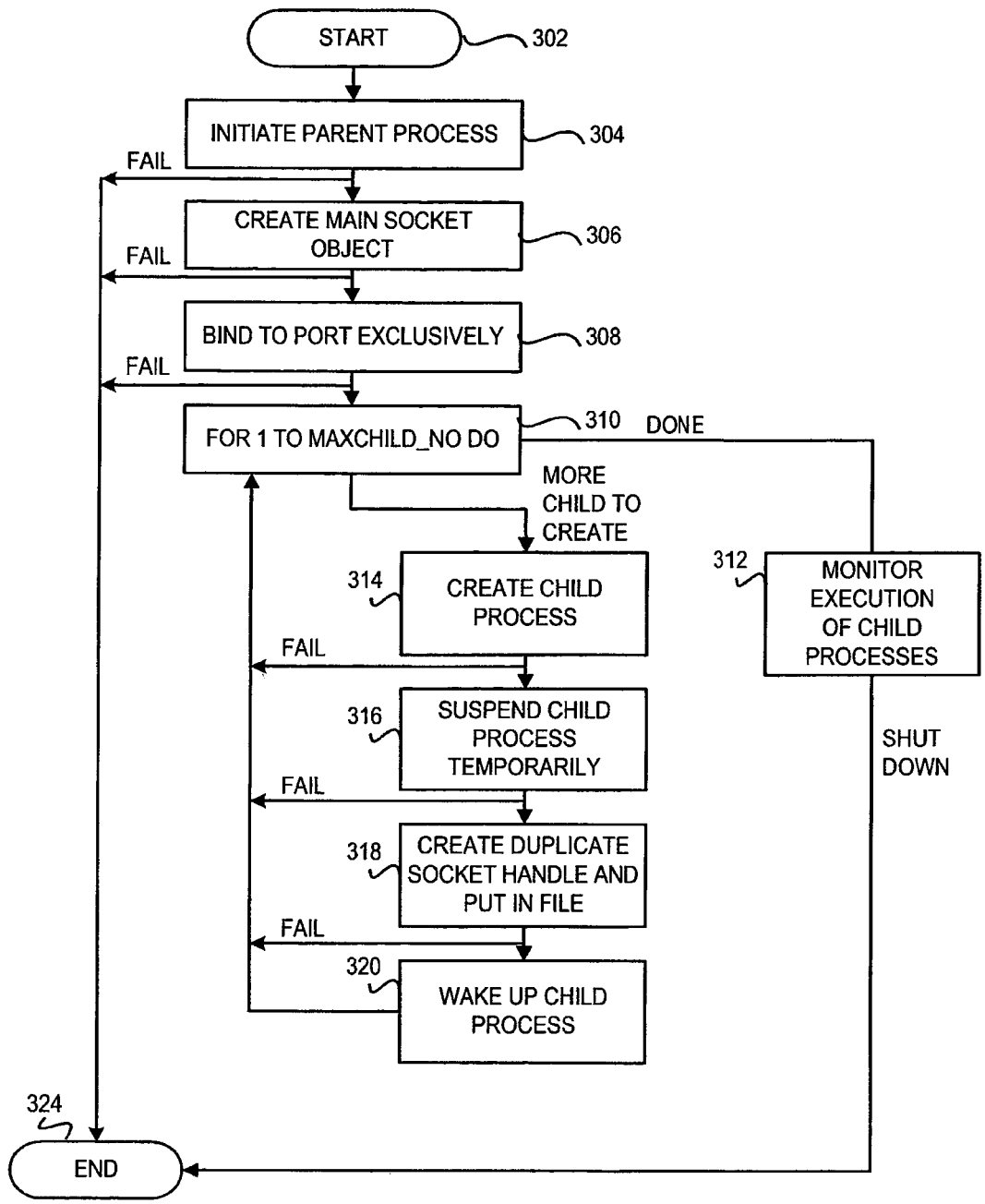
FIG. 3 is a flowchart illustrating, in accordance with an embodiment of the present invention, the steps taken by a parent process in implementing the internet service.

FIG. 3 is a flowchart illustrating, in accordance with an embodiment of the present invention, the steps taken by a parent process in implementing the internet service. From start step 302, the parent process (such as process 220 of FIG. 2) initiates in step 304. After being initiated, the main socket object is created (306) and exclusively binds to the port (such as port 226 of FIG. 2) in step 308. Note that if any of steps 304, 306, or 308 fails, the implementing procedure fails to step 324.

Steps 314, 316, 318, and 320 are performed for each spawned child process, with one iteration being performed for each child process. Supposed there are N child processes to spawn (N=Maxchild_No as shown in block 310). For each iteration, a child is first created (314). After being created, the parent process may temporarily suspend (316) the child process in an embodiment. While the child process is in a suspended state, a duplicate socket handle that is a duplicate of the socket handle associated with the parent object is created. This duplicate socket handle is put in a file that is specifically associated with the ID of the child process. In an embodiment, the duplicate socket handle is created by the Windows API (Application Programming Interface) WSADuplicateSocket( ).

After the duplicate socket handle is created in the file, the parent process may wake up the child process (320). Once all N child processes are activated, the parent process monitors execution parameters pertaining to the child processes and may replace any faulted child process by activating a substitute child process (312) so that the substitute child process may begin creating and executing threads to service the remotely connected users. Access by a thread to port 226 is governed by an appropriate arbitration mechanism such as a global lock.

Figure 4:
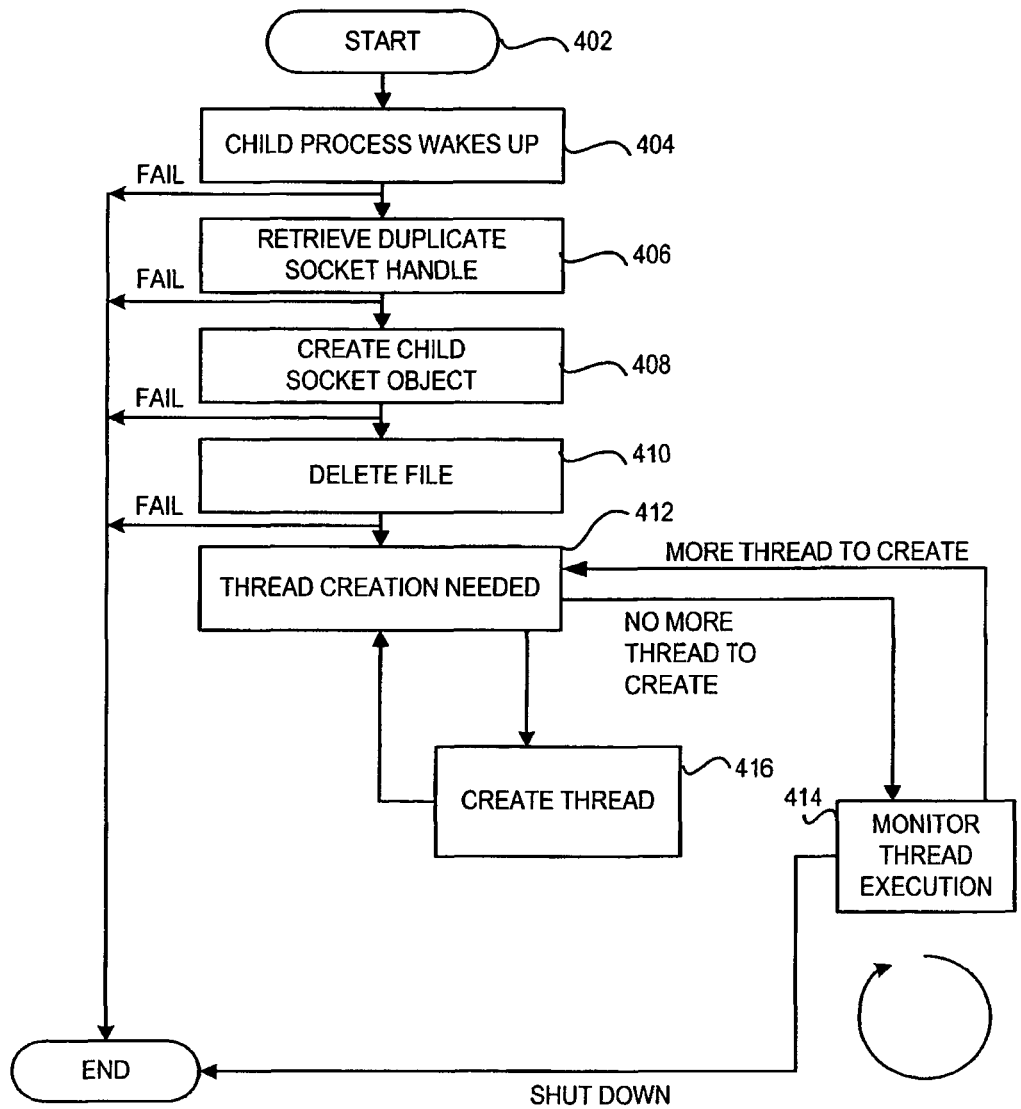
FIG. 4 is a flowchart illustrating, in accordance with an embodiment of the present invention, the steps taken by a child process in implementing the internet service.

FIG. 4 is a flowchart illustrating, in accordance with an embodiment of the present invention, the steps taken by a child process in implementing the internet service. From start step 402 where the child was already in a suspended or sleep state, the child process wakes up (404). Once awaken, code in the child process causes the child process to seek out and obtain the duplicate socket handle from the file that is specifically associated with the ID of that child process (406). In step 408, a child socket object is created using the retrieved duplicate socket handle. This cause the child socket object to bind to the same port as the port to which the parent process is exclusively binded. In a step 410, the file that holds the duplicate socket handle for the child process may now be removed.

In step 412 and 416, the child process iteratively creates threads for servicing the remotely connected users. If all threads are created, the child process enters into a monitoring mode to monitor thread execution (414). This monitoring continues until another child thread is needed or if an existing child thread is interrupted or faulted, at which time that existing child process enters into a fault state and possibly terminates if the fault is not remedied. Even if the child process (e.g., child process 242*a*) terminates, other surviving child processes may continue to execute their threads to service other web-based customers.

As can be appreciated from the foregoing, embodiments of the invention implement a highly secure and reliable internet service. Security is provided by the exclusive binding mechanism that prevents an unauthorized process from binding to the same port to illegally intercept data. Reliability is provided by distributing the threads among multiple child processes, which child processes innovatively bind to the same port as the port to which the parent exclusively binds to. In this manner, if any one child process terminates, only users serviced by threads associated with the terminated child process are affected, and other users may continue to enjoy the internet service without interruption.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for implementing internet service, the method comprising:
   exclusively binding a first socket handle object of a first process with a first port;
   generating a first child process from said first process;
   creating a first duplicate socket handle of said first socket handle object in a first file, said first file being associated with an id of said first child process; and
   forming, using said first child process, a first child socket handle object from said first duplicate socket handle in said first file, thereby causing said first child socket handle object to be associated with said first port.

2. The method of claim 1 further comprising:
   generating a second child process from said first process;
   creating a second duplicate socket handle of said first socket handle object in a second file, said second file being associated with an id of said second child process; and
   forming, using said second child process, a second child socket handle object from said second duplicate socket handle in said second file, thereby causing said second child socket handle object to be associated with said first port.

3. The method of claim 2 wherein said creating said first duplicate socket handle and said creating said second duplicate socket handle employ Windows API (application programming interface).

4. The method of claim 2 further comprising:
   temporarily suspending said first child process after said generating said first child process prior to said creating said first duplicate socket handle in said first file; and
   waking up said first child process after said creating said first duplicate socket handle in said first file, thereby enabling said first child process to form said first child socket handle object from said first duplicate socket handle in said first file.

5. The method of claim 2 further comprising spawning a plurality of threads from each of said first child process and said second child process, each thread in said plurality of threads providing said Internet service to a respective web browser that is connected to said internet server via the Internet.

6. The method of claim 5 further comprising:
   monitoring, using said first process, execution parameters pertaining to said first child process and said second child process; and
   generating a replacement child process to replace one of said first child process and said second child process if said one of said first child process and said second child process encounters a fault condition.

7. The method of claim 5 wherein said first process does not spawn a thread for providing said Internet service to a web browser that is connected to said internet server via the Internet.

8. The method of claim 1 wherein said exclusive binding is configured to prevent a process other than said first process and child processes of said first process from binding with said first port.

9. An article of manufacture comprising a non-transitory program storage medium having computer readable code embodied therein, said computer readable code being configured to implement internet service in an internet server, comprising:
   computer readable code for exclusively binding a first socket handle object of a first process with a first port;
   computer readable code for generating a first child process from said first process;
   computer readable code for creating a first duplicate socket handle of said first socket handle object in a first file, said first file being associated with an id of said first child process; and
   computer readable code for forming, using said first child process, a first child socket handle object from said first duplicate socket handle in said first file, thereby causing said first child socket handle object to be associated with said first port.

10. The article of manufacture of claim 9 further comprising:
    computer readable code for generating a second child process from said first process;
    computer readable code for creating a second duplicate socket handle of said first socket handle object in a second file, said second file being associated with an id of said second child process; and
    computer readable code for forming, using said second child process, a second child socket handle object from said second duplicate socket handle in said second file, thereby causing said second child socket handle object to be associated with said first port.

11. The article of manufacture of claim 10 wherein said computer readable code for creating said first duplicate socket handle and said creating said second duplicate socket handle includes computer readable code for manipulating Windows API (application programming interface).

12. The article of manufacture of claim 10 further comprising:
computer readable code for temporarily suspending said first child process after said generating said first child process prior to said creating said first duplicate socket handle in said first file; and
computer readable code for waking up said first child process after said creating said first duplicate socket handle in said first file, thereby enabling said first child process to form said first child socket handle object from said first duplicate socket handle in said first file.

13. The article of manufacture of claim 10 further comprising computer readable code for spawning a plurality of threads from each of said first child process and said second child process, each thread in said plurality of threads providing said Internet service to a respective web browser that is connected to said internet server via the Internet.

14. The article of manufacture of claim 13 further comprising:
computer readable code for monitoring, using said first process, execution parameters pertaining to said first child process and said second child process; and
computer readable code for generating a replacement child process to replace one of said first child process and said second child process if said one of said first child process and said second child process encounters a fault condition.

15. The article of manufacture of claim 13 wherein said first process does not spawn a thread for providing said Internet service to a web browser that is connected to said internet server via the Internet.

16. A method for implementing internet service for a plurality of remote users, the method comprising:
exclusively binding a first socket handle object of a first process with a first port; and
iteratively activating a plurality of child processes by performing:
(a) generating a child process,
(b) suspending said child process after said generating said child process,
(c) creating a duplicate socket handle of said first socket handle object in a file, said file being associated with an id of said child process of step (a) while said child process is suspended,
(d) waking up said child process from said suspending, and
(e) forming, using said child process after said waking, a child socket handle object from said duplicate socket handle in said file, thereby causing said child socket handle object to be associated with said first port;
wherein said steps (a) through (e) are performed to activate each child process of said plurality of child processes until said plurality of child processes are activated, and wherein said plurality of child process, not said first process, are responsible for executing threads that provide said internet service to said plurality of remote users.

17. The method of claim 16 wherein said creating said duplicate socket handle for said each child process of said plurality of child processes employs Windows API (application programming interface).

18. The method of claim 16 further comprising:
monitoring, using said first process, execution parameters pertaining to said plurality of child processes; and
generating a replacement child process to replace one of said plurality of child processes if said one of said plurality of child processes encounters a fault condition.

19. The method of claim 18 wherein child processes of said plurality of child processes that are not faulted are configured to continue providing said internet services for their respective users even if said one of said plurality of child processes encounters said fault condition.

20. The method of claim 16 wherein said internet service represents selling merchandises via the Internet to said plurality of remote users.

21. The method of claim 16 wherein said exclusive binding is configured to prevent a process other than said first process and child processes of said first process from binding with said first port.

22. The method of claim 16 wherein said internet service represents an email relay service.

* * * * *